United States Patent [19]
Cambridge et al.

[11] Patent Number: 5,738,441
[45] Date of Patent: Apr. 14, 1998

[54] ELECTRONIC CLINICAL PREDICTIVE THERMOMETER USING LOGARITHM FOR TEMPERATURE PREDICTION

[75] Inventors: Vivien J. Cambridge, Slidell, La.; Thomas L. Koger, Bay St. Louis, Miss.; William L. Nail, Picayune, Miss.; Patrick Diaz, D'Iberville, Miss.

[73] Assignee: The United States of America as represented by the Administrator of the National Aeronautics and Space Administration, Washington, D.C.

[21] Appl. No.: 500,806

[22] Filed: Jul. 11, 1995

(Under 37 CFR 1.47)

[51] Int. Cl.⁶ .................................................. G01K 3/00
[52] U.S. Cl. .......................................... 374/102; 364/557
[58] Field of Search .................................. 364/556, 557, 364/573, 577; 374/102, 103, 104, 105, 106, 170, 171; 128/736

[56] References Cited

U.S. PATENT DOCUMENTS

| | | | |
|---|---|---|---|
| 4,727,500 | 2/1988 | Jackson et al. | 364/557 |
| 4,733,974 | 3/1988 | Hagerman | 374/103 |
| 5,116,136 | 5/1992 | Newman et al. | 374/102 |
| 5,388,134 | 2/1995 | Douglass et al. | 374/102 |
| 5,392,031 | 2/1995 | Toriumi et al. | 340/588 |
| 5,453,682 | 9/1995 | Hinrichs et al. | 371/171 |
| 5,632,555 | 5/1997 | Gregory et al. | 374/102 |

FOREIGN PATENT DOCUMENTS

| | | | |
|---|---|---|---|
| 0332700A1 | 9/1989 | European Pat. Off. | G01K 7/00 |
| 0482562A2 | 4/1992 | European Pat. Off. | G01K 1/00 |
| 0561348A1 | 9/1993 | European Pat. Off. | G01K 1/00 |
| 59-187233A | 10/1984 | Japan | G01K 7/00 |
| 58-60584 | 4/1993 | Japan | G01K 7/00 |

OTHER PUBLICATIONS

Rapid Temperature Measurement by Calculating the Final Temperature Within the Response Time, 2383 Biomedizinische Technik 39(1994) Sep., No. 9, Berlin, DE (translation enclosed) (no month).

*Primary Examiner*—William L. Oen
*Attorney, Agent, or Firm*—Fulwider Patton Lee & Utecht, LLP

[57] ABSTRACT

A thermometer that rapidly predicts body temperature based on the temperature signals received from a temperature sensing probe when it comes into contact with the body. The logarithms of the differences between the temperature signals in a selected time frame are determined. A line is fit through the logarithms and the slope of the line is used as a system time constant in predicting the final temperature of the body. The time constant in conjunction with predetermined additional constants are used to compute the predicted temperature. Data quality in the time frame is monitored and if unacceptable, a different time frame of temperature signals is selected for use in prediction. The processor switches to a monitor mode if data quality over a limited number of time frames is unacceptable. Determining the start time on which the measurement time frame for prediction is based is performed by summing the second derivatives of temperature signals over time frames. When the sum of second derivatives in a particular time frame exceeds a threshold, the start time is established.

42 Claims, 9 Drawing Sheets

ELECTRONIC CLINICAL PREDICTIVE THERMOMETER USING LOGARITHM FOR TEMPERATURE PREDICTION

BACKGROUND

The invention relates generally to improvements in thermometers and, more particularly, to electronic thermometers for more rapidly obtaining accurate temperature measurements.

It is common practice in the medical arts, as in hospitals and in doctors' offices, to determine the body temperature of a patient by means of a temperature sensitive device that not only measures the temperature but also displays that temperature. One such device is a glass bulb thermometer incorporating a heat responsive mercury column that expands and contracts adjacent a calibrated temperature scale. Typically, the glass thermometer is inserted into the patient, allowed to remain for a sufficient time interval to enable the temperature of the thermometer to stabilize at the body temperature of the patient, and subsequently removed for reading by medical personnel. This time interval is usually on the order of 2 to 8 minutes.

The conventional temperature measurement procedure using a glass bulb thermometer or the like is prone to a number of significant deficiencies. Temperature measurement is rather slow and, for patients who cannot be relied upon (by virtue of age or infirmity) to properly retain the thermometer for the necessary period of insertion in the body, may necessitate the physical presence of medical personnel during the relatively long measurement cycle, thus diverting their attention from other duties. Furthermore, glass bulb thermometers are not as easy to read and, hence, measurements are prone to human error, particularly when made under poor lighting conditions or when read by harried personnel.

Various attempts have been made to minimize or eliminate these deficiencies of the glass bulb thermometer by using temperature sensing probes that are designed to operate in conjunction with direct reading electrical thermometer instrumentation. In one such approach, an electronic temperature sensitive device, such as a thermistor, is mounted at the end of a probe and inserted into the patient. The change in voltage or current of the device, depending on the particular implementation, is monitored and when that output signal stabilizes, a temperature is displayed in digital format. This is referred to as the direct reading approach and while it reduces the possibility error by misreading the measured temperature, it may still require a relatively long period of time in which to reach a stabilized temperature reading.

An inherent characteristic of electronic thermometers is that they do not instantaneously measure the temperature of the body to which they are applied. It may take a substantial period of time before the temperature indicated by the thermometer is representative of the actual temperature of the body measured. This lag is caused by the various components of the measurement system that impede heat flow from the surface of the body to the temperature sensor. Some of the components are the sensor tip, the skin and tissue of the body, and any hygienic covering applied to the sensor tip to prevent contamination between measurement subjects. This approach therefore provides only a partial solution.

One attempt to overcome the above-described deficiencies involves the use of a temperature sensitive electronic probe coupled with prediction or estimation circuitry to obtain a direct digital display of the patient's temperature before the probe has reached equilibrium with the patient. With this approach, assuming the patient's temperature is not significantly changing during the measurement time, the temperature that will prevail upon thermal stabilization of the electronic thermometer with the patient is predicted from measured temperatures and is displayed before thermal stabilization is attained. Typically, prediction of temperature is performed by monitoring the measured temperature over a period of time as well as the rate of change thereof, and processing these two variables to predict the patient's temperature.

With an electronic thermometer that operates by predicting the final, stable temperature, an advantage is that the temperature measurement is completed before thermal stabilization is attained, thereby reducing the time required for measurement. This would lessen the risk that the patient would not hold the probe in the correct position for the entire measurement time and requires less time of the attending medical personnel. Another advantage is that, because body temperature is dynamic and may significantly change during the two to eight minute interval associated with traditional mercury glass thermometer measurements, a rapid determination offers more timely diagnostic information. However, a disadvantage with such a thermometer is that the accuracy with which temperature is predicted declines markedly unless the processing and analysis of the data are accurately performed.

Electronic thermometers using predictive-type processing and temperature determination may include a thermistor as a temperature-responsive transducer. The thermistor approaches its final stable temperature asymptotically with the last increments of temperature change occurring very slowly, whereas the major portion of the temperature change occurs relatively rapidly. Prior attempts have been made to monitor that initial, more rapid temperature change, extract data from that change, and estimate the actual temperature of the tissue that is contacting the thermistor at that time, long before the thermistor actually stabilizes to the tissue temperature.

A prior approach used to more rapidly estimate the tissue temperature prior to the thermistor reaching equilibrium with the patient is the sampling of data points of the thermistor early in its response and from those data points, predicting a curve shape of the thermistor's response. From that curve shape, an asymptote of that curve and thus the stabilization temperature can be estimated. To illustrate these concepts through an example of a simpler system, consider the heat transfer physics associated with two bodies of unequal temperature, one having a large thermal mass and the other having a small thermal mass, placed in contact with each other at time=0. As time progresses, the temperature of the small thermal mass and the large thermal mass equilibrate to a temperature referred to as the stabilization temperature. The equation describing this process is as follows:

$$T(t) = T_R + (T_F - T_R)(1 - e^{(t/\tau)}) \quad \text{(Eq. 1)}$$

where $T(t)$ is the temperature of the smaller body as a function of time, $T_F$ is the stabilization temperature of the system, $T_R$ is the initial temperature of the smaller body, t is time, and $\tau$ is the time constant of the system.

From this relationship, when T is known at two points in time, for example $T_1$ at time $t_1$ and $T_2$ at time $t_2$, the stabilization temperature $T_F$ can be predicted through application of Equation 2 below.

$$T_F = \frac{T_2 - T_1 e^{-\frac{t_2-t_1}{\tau}}}{1 - e^{-\frac{t_2-t_1}{\tau}}} \quad \text{(Eq. 2)}$$

Further, for a simple first order heat transfer system of the type described by Equation 1, it can be shown that the natural logarithm of the first time derivative of the temperature is a straight line with slope equal to $-1/\tau$ as follows:

$$\ln\left(\frac{dT}{dt}\right) = K - \frac{t}{\tau} \quad \text{(Eq. 3)}$$

where K is a constant dependent upon the $T_R$, $T_F$ and $\tau$.

Prior techniques have attempted to apply these simple first order relationships through the use of thermistor time constants established by the thermistor manufacturer. However, these techniques have failed to recognize that the temperature response curve cannot be modeled as first order and is, to a great extent, affected by factors not reflected by the thermistor's time constant. When the thermometer is placed in contact with body tissue, such as a person's mouth for example, the response curve depends on the physical placement of the probe in relation to that tissue, on the heat transfer characteristics of the particular tissue, and on the hygienic covers that separate the probe from the tissue. All of these factors contribute to the heat flow characteristics of the measurement system and they are not represented in the factory-supplied time constant of the thermistor alone. Moreover, the factors described above impede the flow of heat in series and with different resistance characteristics, thus causing an overall time response behavior that is not that of a first order system.

The need therefore has arisen for a measurement system that could predict stabilization temperatures and could adapt to the changing heat flow characteristics of both the body under measurement and the measurement system itself, unlike a first order model. Adaptive techniques have been proposed that use sets of simultaneous equations solved in real time to yield a likely temperature rise curve that indicates the stabilization temperature. To be successful, such techniques require use of equations with substantial numbers of coefficients so that the shape of the rise curve can be adequately approximated. Simultaneous solution through regression of such a set of equations is not a trivial matter when simple, low power, special purpose microcircuitry is used in the thermometer. Furthermore, to adequately analyze a curve by regression, a substantial portion of the rise curve must be available so that all significant terms of the equation may be resolved. The fact that a significant amount of time may be required to acquire the necessary portion of the rise curve compromises the very purpose of the exercise which is to predict stabilization temperature as early in the measurement as possible.

While prior predictive techniques have advanced the art of electronic thermometry, a need still exists for an electronic thermometer that can predict a stabilization temperature at an early stage of the measurement process where measurement conditions and the characteristics of the body under measurement vary from measurement to measurement. Additionally, a need exists for a thermometer that comprises relatively simple, inexpensive circuitry. The invention fulfills these needs and others.

SUMMARY OF THE INVENTION

Briefly and in general terms, the present invention provides a thermometer and method for determining the temperature of an object by predicting the stabilization temperature at an early stage of the measurement process. The thermometer and method of the present invention relate variables determined from an early portion of the temperature rise curve to the predicted stabilization temperature so that the predictive process is adaptive with respect to the thermal characteristics of the thermometer probe and the object, and requires relatively little data acquisition and data processing time while yielding accurate approximations of the stabilization temperature.

In one aspect, a thermometer for determining the temperature of an object is provided and comprises a sensor that provides temperature signals in response to sensing the temperature of the object, the temperature signals varying in time and a processor that receives the temperature signals, monitors the temperature signals over a first selected time frame, determines a selected characteristic of the temperature signals of the first time frame, calculates the logarithm of the characteristic of the temperature signals and based on the logarithm, calculates the temperature of the object. In a more detailed aspect, the processor selects the first time frame from a time period occurring before the sensor reaches the temperature of the object and uses the logarithm of the characteristic of the temperature signals of the first time frame to calculate a prediction of the temperature of the object.

In further aspects, the characteristic of the temperature signals of the first time frame determined by the processor comprises the differences between the temperature signals of the first time frame and in a more detailed aspect, the characteristic of the temperature signals of the first time frame determined by the processor comprises the derivative of the temperature signals.

In yet another aspect of the invention, the processor calculates the temperature of the object based on the logarithm along with predetermined empirical variables.

In further aspects, the processor compares the temperature signals received in the selected first time frame to a predetermined integrity criterion and if the temperature signals in the frame do not meet the integrity criterion, the processor excludes the first time frame from its calculation of the temperature of the object. In a more detailed aspect, the processor determines the first time derivative of the temperature signals of the selected first time frame and excludes the frame of temperature signals from its calculation of the temperature of the object if the first time derivative is negative within the first time frame.

In yet another aspect, the processor monitors the temperature signals over a second selected time frame if the first selected time frame is excluded in determining the temperature of the object. Further, the processor selects the second time frame to occur after the first time frame in one aspect and in another aspect, the processor selects the second time frame to overlap the first time frame.

In a broader aspect, the processor monitors the temperature signals over a plurality of different selected time frames if the preceding time frame is excluded from the determination of the temperature of the object and the processor limits the number of the plurality of time frames monitored to those occurring within a predetermined period before the sensor reaches the temperature of the object.

In a different aspect, the processor determines a start time at which the sensor has begun sensing the temperature of the object and the processor selects the first time frame to inch& temperature signals occurring after the start time. In a more detailed aspect, the processor determines that the sensor is sensing the temperature of the object by calculating the second derivative of the temperature signals from the sensor and when the second derivative exceeds a threshold, setting the start time based on the calculation. The processor sums the second derivatives of the temperature signals within a selected time frame, compares the sum of the second derivatives to a threshold value, and determines the start time when the sum exceeds the threshold in a more detailed aspect. In connection with the above aspects, the processor sets the start time to occur at the end of the time frame in which the sum of the second derivatives exceeded the threshold.

Other features and advantages of the present invention will become apparent from the following detailed description, taken in conjunction with the accompanying drawings which illustrate, by way of example, the features of the invention.

DETAILED DESCRIPTION OF THE PREFERRED EMBODIMENTS

Figure 1:
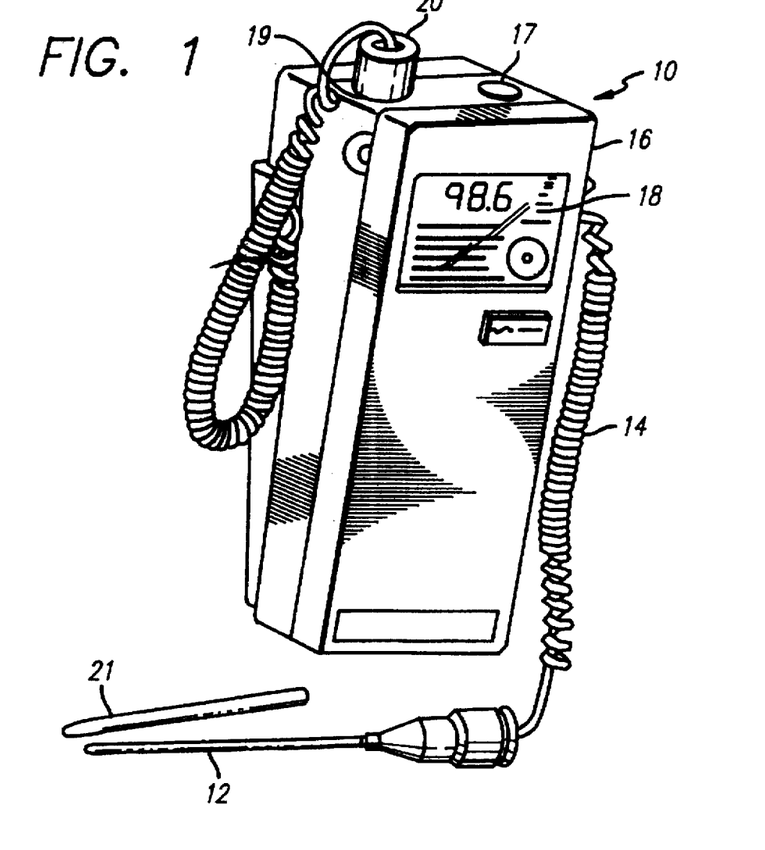
FIG. 1 is a view of an electronic clinical thermometer usable with the invention.

In the following description, like reference numerals will be used to refer to like or corresponding elements in the different figures of the drawings. Referring now to the drawings, and particularly to FIG. 1, there is shown one embodiment of an electronic thermometer incorporating novel features of the present invention. The electronic thermometer 10 contains a probe 12 for sensing the temperature of a selected part of the body, connected by conductors 14 to the main body 16 of the thermometer. As shown in FIG. 1, the probe 12 has been removed from a storage well 17 in the main body. The main body 16 of the thermometer contains the electrical components and power supply of the thermometer, and also has a display 18 for displaying temperature values and error or alarm messages. A second probe 20 is included with the thermometer and is shown in the stored position inserted in a well 19 of the main body 16. Also shown is an hygienic cover 21 for placement over a probe 12 or 20 before insertion of the probe into the patient.

Figure 2:
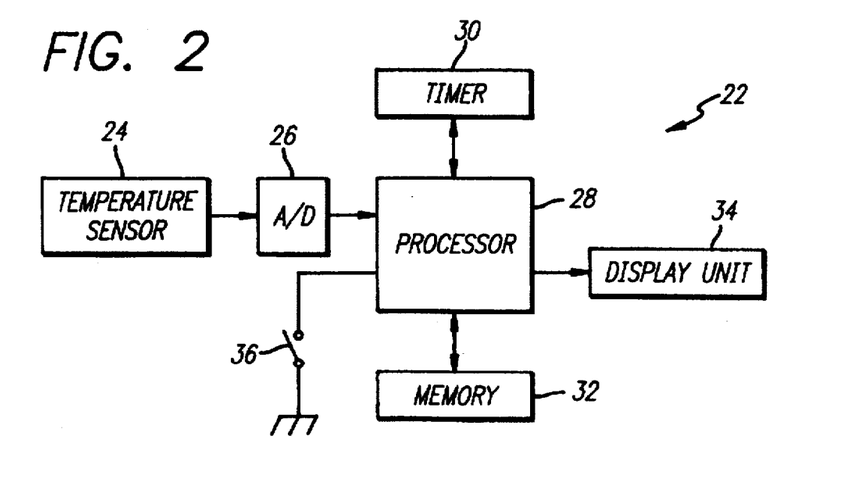
FIG. 2 is a block diagram of a system in accordance with principles of the invention for determining the temperature of an object before final equilibrium of the temperature sensor with the subject.

Referring to FIG. 2, the block diagram generally shows major electronic components of one embodiment of a thermometer 22 in accordance with the present invention. The temperature sensor 24 provides temperature signals in response to the temperature sensed during measurement. In the case where a thermistor is used as the temperature sensor 24, these signals are analog voltages or currents representative of the resistance of the thermistor and therefore representative of the sensed temperature, and are converted into digital form for further processing by an analog-to-digital converter 26. The analog-to-digital converter 26 is connected to a processor 28 that receives the digital temperature signals and processes them to determine the temperature of the subject being measured. A timer 30 provides time signals to the processor 28 used during the processing of the temperature signals, and a memory 32 stores the temperature and time signal data so that the signal data can be analyzed at a subsequent time. The memory 32 also stores empirically-derived constants used by the processor 28 to relate processed temperature data to an estimated time constant. Once the signals have been processed, the processor 28 provides a signal to the display 34 to display the predicted stabilization temperature. The processor 28 may also provide data quality messages to the operator signifying that the data quality is not adequate and that a prediction cannot be completed. Activating a switch 36 enables the temperature measurement functions of the thermometer 22. This switch is preferably located within the probe storage well such that removal of the probe enables the measurement.

Figure 3:
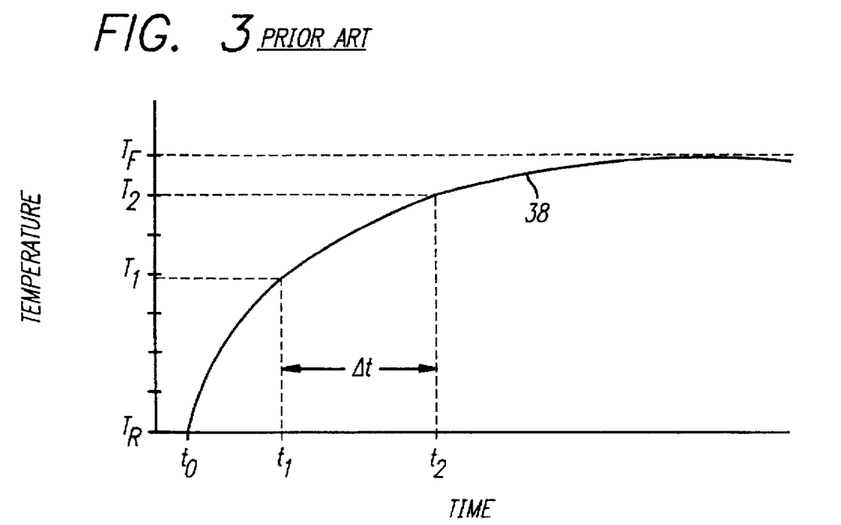
FIG. 3 presents a graph of a typical thermistor response curve to a temperature that differs from its own temperature.

Referring now to FIG. 3, a graph of measured temperature 38 plotted as a function of measurement time for a typical thermistor is shown. Although the relationship illustrated is similar in form to that specified by Equation 1, the measurement system of the present invention does not exhibit first order heat transfer behavior and therefore the curve 38 differs from the simple exponential function of Equation 1. As discussed above, the temperature indicated 38 by the thermistor lags the actual temperature $T_F$ of the subject being measured. This lag is shown by line 38. It can be seen that as the measurement progresses from a start time, $t_0$, the temperature rapidly increases from $T_R$ to $T_1$ between times $t_0$ to $t_1$. The rate of increase in the indicated temperature 38 is reduced between times $t_1$ and $t_2$, and the temperature line 38 gradually tends toward the stabilization temperature $T_F$ asymptotically as the time increases even more. As discussed above, the present invention is directed to a system capable of analyzing the temperature data gathered during an early period of the measurement, for example, between times $t_1$ and $t_2$, and predicting the final temperature $T_F$.

Figure 4:
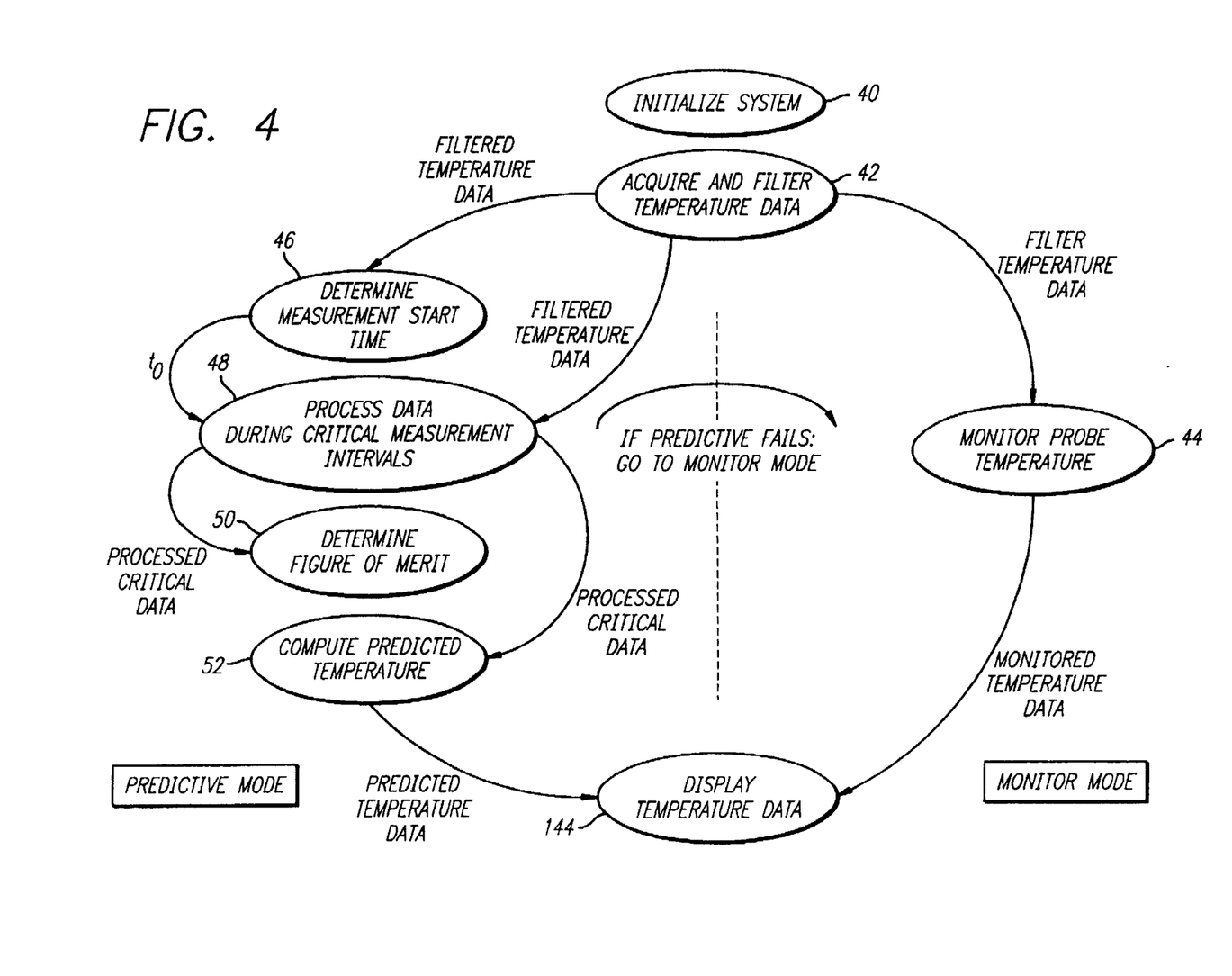
FIG. 4 is a diagram illustrating Data Flow and Tasks in accordance with aspects of the invention.

Referring to FIG. 4, the general functions (tasks) of an embodiment of the system are shown, along with the data that flows among them. The tasks may run concurrently or in sequence, and some tasks shown may not run during a particular measurement carried out by the system. A data flow does not imply an activation sequence; control and activation are not shown on this diagram. The subsequent flow diagrams. FIGS. 5, 6, 8, 9, 11, and 12 illustrate the sequential flow of certain key tasks. The data flows are labeled with the data that is provided to one task by another.

The Initialize System task 40 is run each time the thermometer is activated. It serves to execute all logic that needs to occur only once per measurement. It activates the Acquire and Filter Temperature Data task 42. It will also activate either the Monitor Probe Temperature task 44 in the monitor mode or the predictive measurement group of tasks that include: Determine Measurement Start Time 46, Process Data During Critical Measurement Intervals 48, Determine Figure of Merit 50, and Compute Predicted Temperature 52 in the predictive mode.

Figure 5:
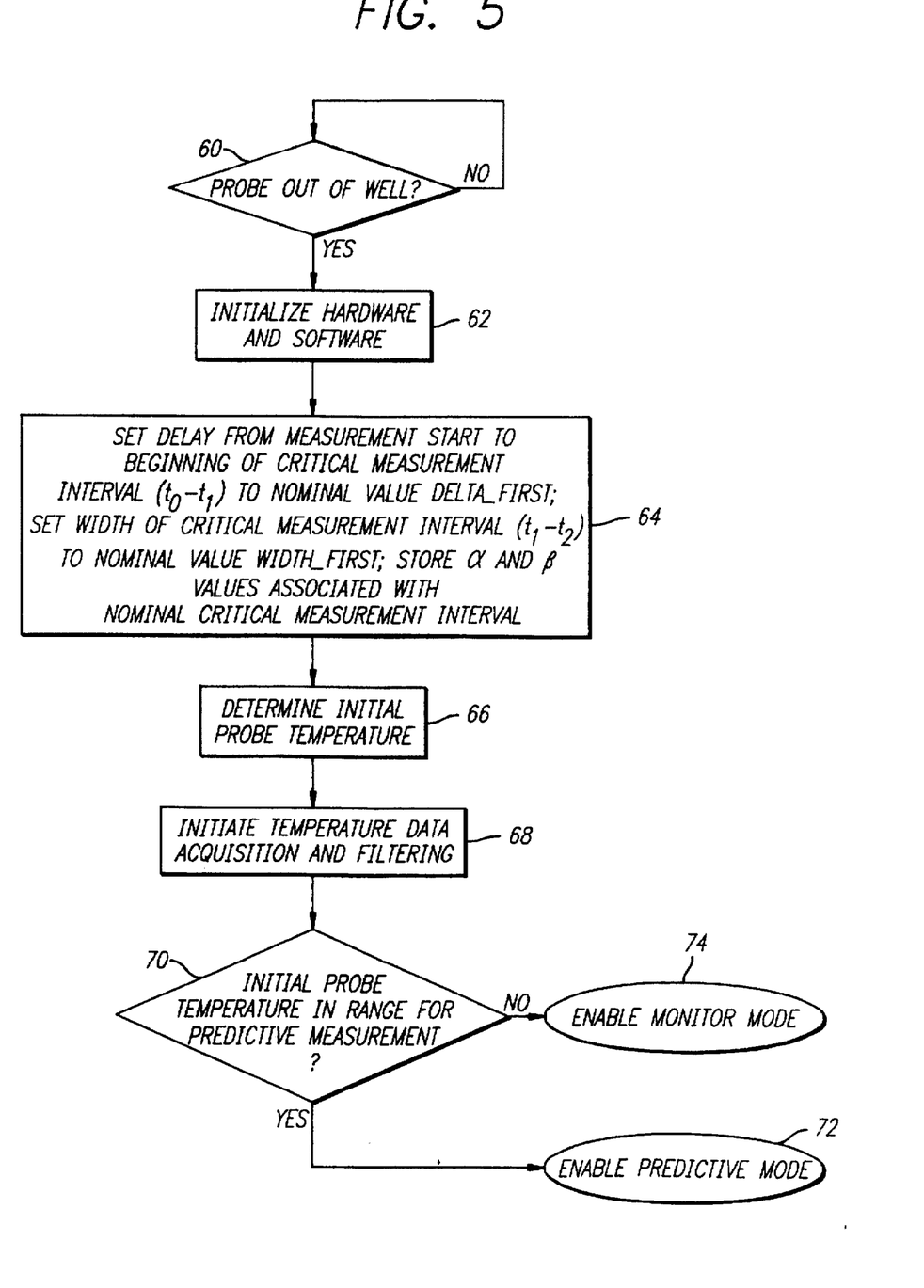
FIG. 5 is an Initialize System flow diagram.

FIG. 5 provides a flow diagram for the Initialize System task. It is initiated when a probe is removed from the well 60. It initializes and tests the hardware devices, and initializes various software values 62. Next the delay from measurement start to the beginning of the critical measurement interval $(t_1-t_0)$ is set to an initial nominal value, delta__first and the width of the critical measurement interval $(t_2-t_1)$ is set to an initial nominal value, width__first 64. In one embodiment, delta__first is seven seconds, and the duration of the critical measurement interval, width__first, is three seconds. Associated with the nominal critical measurement interval are the values $\alpha$ and $\beta$ that may be determined empirically and that are obtained a priori. The constants $\alpha$ and $\beta$ are stored 64 for use later during the computation of the predicted stabilization temperature 52.

The initial probe temperature is determined 66 and temperature data acquisition and filtering is initiated 68. If the initial probe temperature $T_R$ falls into some pre-determined range of acceptability for prediction 70, the predictive mode tasks are activated 72. In one embodiment, this range includes the expected ambient temperature encountered in a hospital environment, 16° C. to 35° C. (61° F. to 95° F.). Should the initially sensed probe temperature be outside this range, yet still within the operating range of the instrument, the monitor mode task is activated 74. In either case, the thermometer will begin the continuous task of collecting and filtering data signals 68. In the monitor mode, the system measures and displays the temperature of the thermistor in the probe tip without performing any predictive functions.

Figure 6:
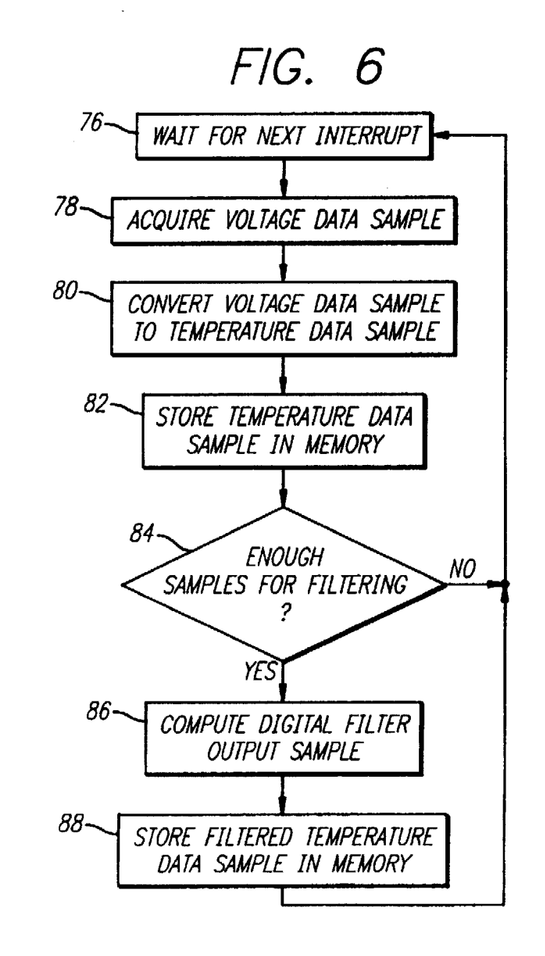
FIG. 6 is a flow diagram of Acquire and Filter Temperature Data.

FIG. 6 provides a flow diagram for an embodiment of the Acquire and Filter Temperature Data task. The illustrated steps, once initiated, are carried out with precise timing and without interruption to ensure no loss of data and no timing inaccuracy. The processor 28, timer 30, and analog-to-digital converter 26 (FIG. 2) acquire and filter incoming temperature sensor data to remove line noise and other interference that may affect the quality of the temperature determination. Various techniques well known in the area of signal processing may be used in this process.

In a preferred embodiment, with each timer interrupt 76, the system acquires voltage input 78. This voltage is related to the resistance, and thus the temperature, of the thermistor at the probe tip. A typical mathematical relationship applied to this voltage converts it 80 to a temperature value, which is stored 82. This mathematical relationship takes into account the thermistor characterization data supplied by its manufacturer, along with the particular circuit details having to do with the interconnection of the thermistor to the analog-to-digital converter, and is well-known to those skilled in the art.

When there are sufficient samples for filtering 84, which depends on the particular type of filter implemented, a digitally filtered temperature data point is computed 86 and stored 88. The system then awaits the next interrupt 76. In a preferred embodiment of the invention, the digital filtering process is a low-pass filter process, which could be a simple data averaging filter. Filtered temperature sensor data is stored in the memory 32 (FIG. 2) for further processing. This filtered data is preferably provided at a slower data rate than the incoming temperature sensor data. In one embodiment, the thermistor temperature is sampled at a rate of sixty-four samples per second and the filtering process produces samples at a rate of eight samples per second. The resulting filtered temperature data 42 is available to other tasks of the system, including Monitor Probe Temperature 44, Determine Measurement Start Time 46, and Process Data During Critical Measurement Intervals 48 (FIG. 4). The filtered temperature data includes both the filtered temperature values and the times associated with each filtered value. In an alternate embodiment, the filtering step takes place prior to conversion of the sensor signal to a temperature rather than after conversion of the sensor signal to temperature as indicated in the figure.

Because the empirical relationship between data in the aforementioned critical measurement interval and the estimated time constant depends on the time interval between the insertion of the probe and the start of the critical measurement interval, the present predictive technique requires an accurate determination of when the probe comes into contact with the subject. Previous approaches, where determination of initial time was less critical, required the operator to provide a signal to the processor signifying the start of a measurement by, for example, pushing a switch on either the main body of the thermometer or the probe of the thermometer.

An alternate approach is to automatically initiate the measurement when the probe experiences a change of temperature. This alternate approach, however, may be subject to error due to the occurrence of temperature events that are similar to those signifying the onset of a measurement but are in fact not due to a measurement. The present invention therefore embodies a method of automatically determining the start time of a measurement and assumes that the temperature of the tissue is significantly different than the initial temperature of the thermistor by a threshold amount. This automatic determination of measurement start time thus reveals whether a measurement is actually taking place, or whether a spurious signal is being received.

Figure 7:
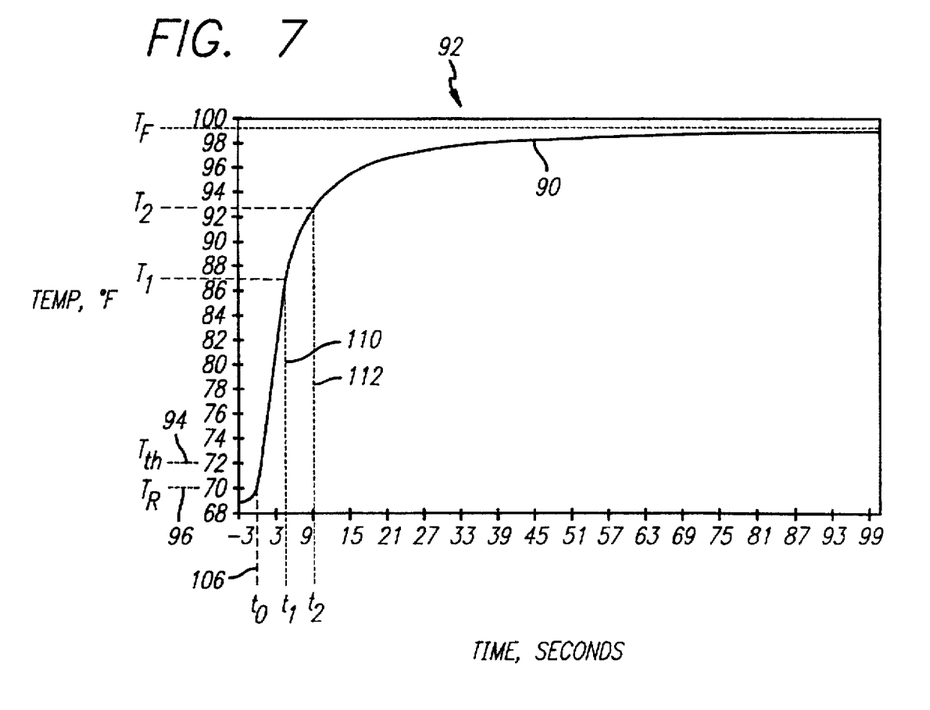
FIG. 7 is a graph of temperature signals from a sensor plotted as a function of time illustrating the measurement start time, a critical measurement interval, and the stabilization temperature.
Figures 8, 8A:
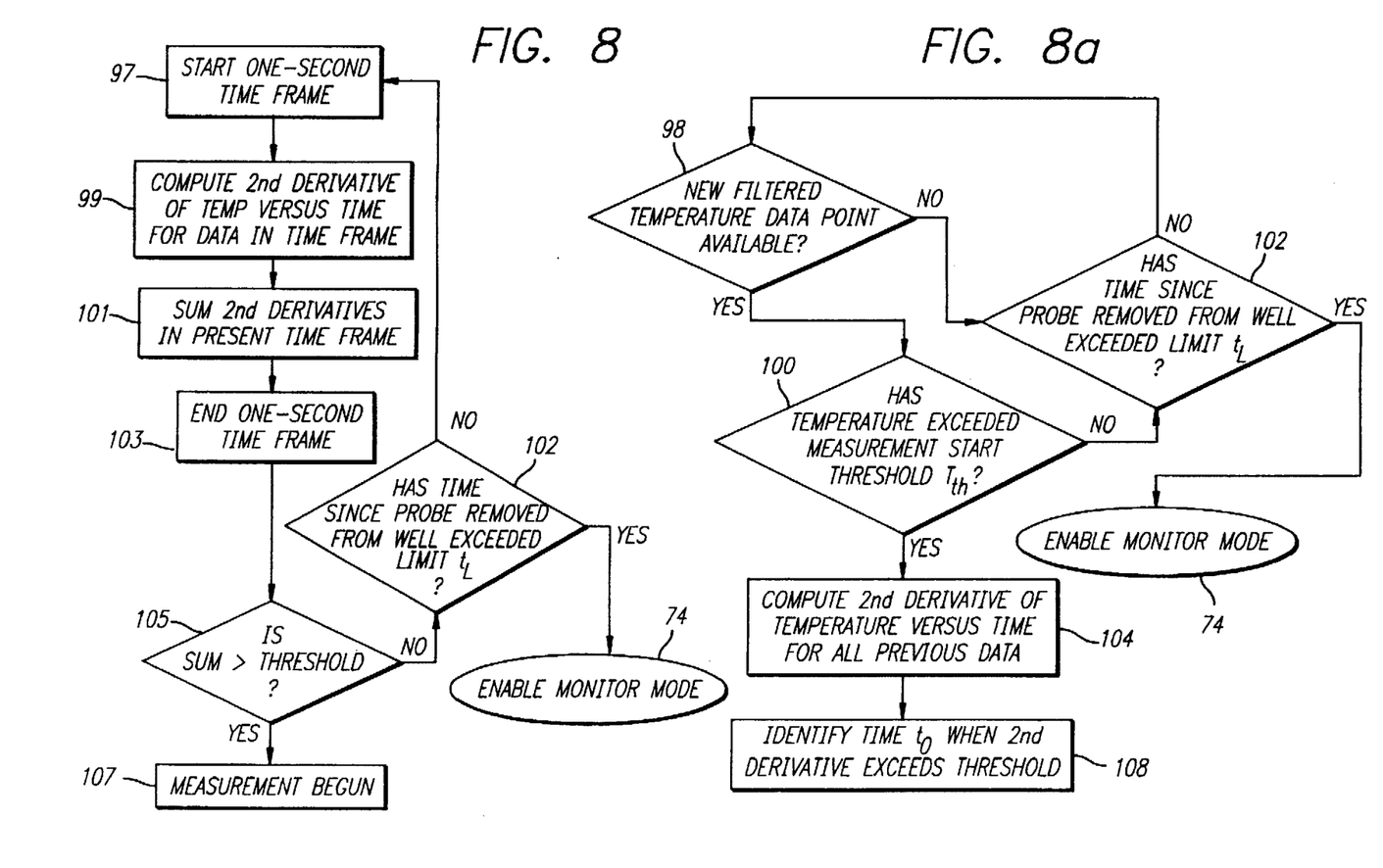
FIG. 8 is a flow diagram of one embodiment to Determine Measurement Start Time.
FIG. 8a is a flow diagram of a second embodiment to Determine Measurement Start Time.

Referring to both FIGS. 7 and 8, a method of determining the measurement start time $t_0$ is generally described. The temperature sensor provides temperature signals as a function of measurement time, as illustrated by the data points 90 plotted on the graph 92, in which the vertical axis is temperature and the horizontal axis is time. During the early stages of the measurement, there may be little change in the temperature signals or spurious data may be received. This can be due to a variety of reasons, such as improper placement of the temperature sensor 24 or handling of the sensor 24 by the operator. At some time, however, the temperature signal represented by the data points 90 begins to exhibit a steep slope indicative of tissue contact and the start of a measurement.

In one embodiment, the temperature signal is monitored in one-second frames of data beginning at the time the probe 12 is removed from the well 17 and the temperature signals are received from the sensor 24. During each one-second frame of data, the second derivatives of the data in that frame are summed. When that sum exceeds a threshold value, the processor determines that a measurement is taking place. The start time is then set to be the time at the end of that one-second frame.

As can be seen from FIG. 7, the temperature curve 90 begging at the left side has a parabolic-type shape during its initial temperature rise (from time of approximately −3 through $t_0$). During this parabolic-type shape of the curve 90, there are sustained, positive second derivatives that when summed in a particular time frame in or including that curve shape, would exceed the threshold value. When the sum exceeds the threshold, the processor determines that the measurement has begun.

The predetermined threshold value is set at a high enough level to avoid false start times. For example, waving the probe 12 in the air may result in a brief temperature rise indication from the probe under certain conditions. However, that brief temperature rise should not reach the level of the threshold value and a start time should not be determined to exist. Typically, when the waving ceases, the temperature of the probe will decrease to the previous value thus resulting in a negative second derivative and when summed with the second derivative representing the previous rise in temperature in the same time frame, that sum will be reduced and may equal zero.

FIG. 8 provides a flow diagram for the Determine Measurement Start Time for this first embodiment. A one-second time frame is started 97. The second derivatives of the data points in that one-second time frame are computed 99 and summed 101. At the end of that one-second time frame 103, the sum of the second derivatives is compared to the predetermined threshold 105 and if that sum exceeds the threshold, the processor determines that the measurement has begun 107. If the sum does not reach the threshold, the elapsed time is compared against the time-out time limit $t_L$ 102. If the probe stays out of the well for too long without seeing some characteristic rise, as could be the case when the user fails to place the probe in the patient or when the patient temperature is equal to or less than the initial thermistor temperature, the thermometer lapses into the monitor mode 74. In one embodiment, the time-out limit $t_L$ is set to one minute. If the time limit has not been exceeded, a new one-second time frame is begun 97.

In another embodiment used to determine the start time, the processor 28 (FIG. 2) monitors the temperature signals from the probe 12 and compares them to a predetermined temperature threshold $T_{th}$ 94 as they are received. As long as the data remains within the range of $T_R$ 96 to $T_{th}$ 94, the processor concludes that no measurement is occurring. But when a temperature signal exceeds the threshold $T_{th}$ 94, the processor concludes that a measurement is actually taking place. Once the processor has determined that a measurement is taking place, the precise time that the measurement began is determined.

FIG. 8a provides a flow diagram for the Determine Measurement Start Time task for this second embodiment. Each time the input filter (FIG. 6) provides a new data point 86 and it is received 98 by the processor 28, a check 100 is made to determine whether the new point exceeds the pre-determined temperature threshold $T_{th}$ 94. In one embodiment, $T_{th}$ is set to 2° F. (1.1° C.) above the initial probe temperature $T_R$ 96. While this threshold is not exceeded, the system checks for a time-out $t_L$ 102. If the probe stays out of the well for too long without seeing some characteristic rise, the thermometer lapses into the monitor mode 74. If this time-out has not occurred, the thermometer awaits the next data point 98 and repeats the checks.

Once $T_{th}$ 94 is exceeded 100, the system proceeds with its analysis of the available data. The processor calculates the second time derivative of the temperature for all previous data points 104. The point in time that the second derivative exceeds a certain threshold value is determined to be the measurement start time $t_0$ 106 at which tissue contact had been made 108.

Another embodiment incorporates a less complex means of determining $t_0$ which is to look for the earliest point at which the first time derivative of temperature exceeds a threshold.

Figure 9:
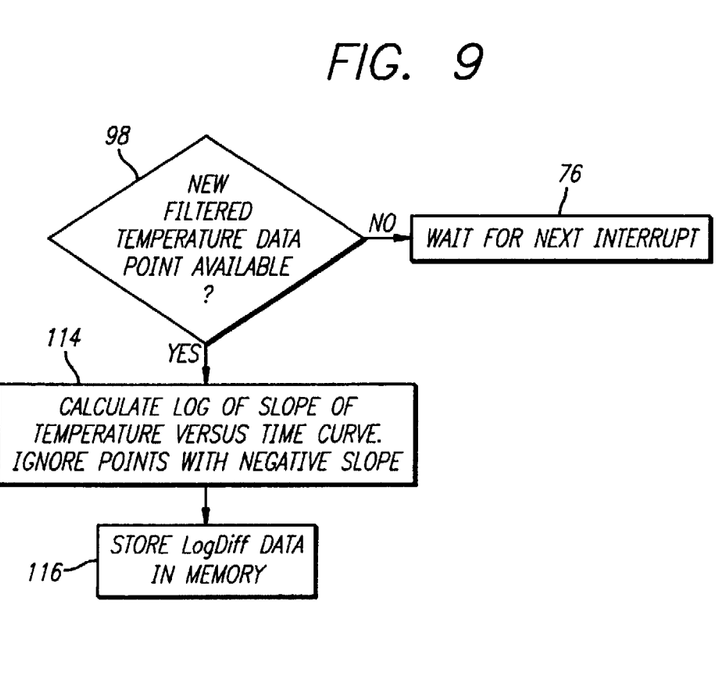
FIG. 9 is a flow diagram of computational steps taking place for Process Data During Critical Measurement Intervals.
Figure 10:
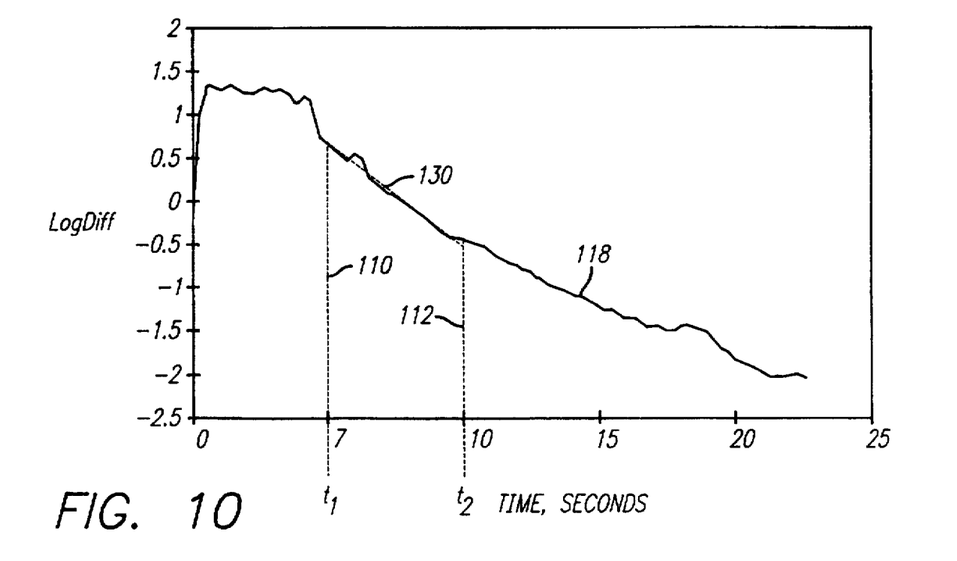
FIG. 10 is a graph of the logarithm of the time derivative of temperature data showing measurement start time, critical measurement interval, and a best fit line.

FIG. 9 provides a flow diagram for the Process Data During Critical Measurement Intervals task. Referring now to FIGS. 7, 9, and 10, during system initialization, the beginning of the critical measurement interval $t_1$ 110 is initialized 64 (FIG. 5) to be a nominal time after $t_0$ 106. Additionally, the duration of the critical measurement interval, from $t_1$ 110 to $t_2$ 112, is preferably initialized. The filtered data received during this interval ($t_1$ to $t_2$) is used in the prediction of the body temperature. In preferred embodiments, the data is processed digitally, and each filtered temperature data point therefore has a specific index. Here we will use the index "n", with n=0 representing the time=$t_0$ 106. We also represent the sampling rate of the filtered temperature data as $f_s$ in samples per second, and therefore the data point at index n=$t_1 * f_s$ is the first point contained within the critical measurement interval. Similarly the data point at n=$t_2 * f_s$ is the last point contained within the critical measurement interval.

In FIG. 9, for each new filtered data point available 98, the difference is taken between it and the point immediately previous to it. The logarithm of this difference is then computed 114 and stored 116. We call the resulting value the LogDiff. FIG. 10 illustrates LogDiff data 118 from measurement start through a critical measurement interval. The data of curve 118 is computed from a measurement such as that illustrated in FIG. 7 for which the temperature rises monotonically during the interval from $t_1$ to $t_2$. The LogDiff computations of FIG. 9 must be performed beginning at time=$t_0$+delta__first and proceeding until either a prediction can be computed or the system lapses into the monitor mode. In one preferred embodiment, the LogDiff is computed in a manner equivalent to the left hand side of Equation 3 by calculating the natural logarithm of the slope of the temperature versus time curve 90:

$$\text{LogDiff}_n = \ln\left[\frac{(T_{n+1} - T_{n-1})}{\left(\frac{2}{f_s}\right)}\right] = \left\{\ln\left(\frac{dT}{dt}\right)\right\}_{t=\frac{n}{f_s}} \quad \text{(Eq. 4)}$$

where $T_n$ is the filtered temperature data point at time n/$f_s$, and where this computation is performed only when ($T_{n+1} - T_{n-1}$) is positive and only for times within the critical measurement interval under consideration.

In one embodiment, the quality of the data received during the critical measurement interval is analyzed to determine if it is high enough for a prediction to be made. In this embodiment, a real-time data integrity analysis is made. The slope of the data within the critical measurement interval is continuously monitored in real time. If the slope of the data equals zero or is negative, the processor 28 concludes that this data is not suitable for predictive computation and, provided the number of allowable retries has not been exceeded, a new critical measurement interval is selected, as discussed below. A decrease in temperature evidenced by a negative slope may be caused by loss of tissue contact. If the slope remains positive throughout the interval, the data is considered to be of high enough quality to perform a prediction from that measurement interval.

Figure 11:
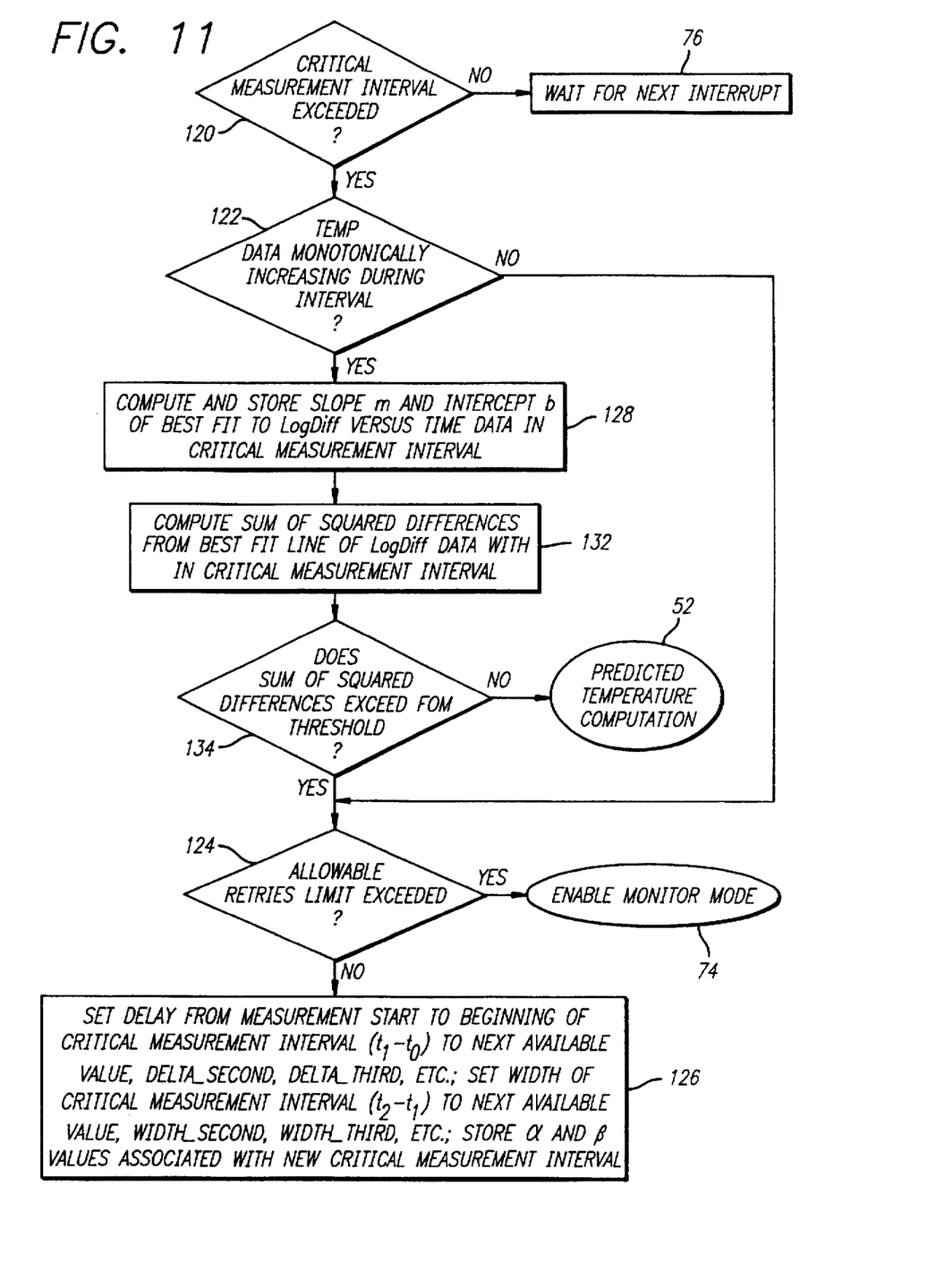
FIG. 11 is a flow diagram of a process to Determine the Figure of Merit associated with a critical measurement interval.

In another embodiment, a figure of merit ("FOM") is calculated and analyzed to determine data quality. FIG. 11 illustrates the logical flow of the Determine Figure of Merit task 50. When the time allotted for this measurement interval has elapsed 120 ($t_2$ is reached), a check of the temperature data within the critical measurement interval is performed 122 to ascertain whether or not the temperature was rising monotonically throughout the interval. If there is any period during the critical measurement interval during which the temperature decreases over time (a negative slope) the processor 28 concludes that this data is not suitable for predictive computation and, provided the number of allowable retries has not been exceeded 124, a new critical measurement interval 126 is selected. Otherwise, a computation is performed to determine the slope m and the intercept b of the line that best fits the LogDiff values versus time 128. The best fit straight line is determined by simple linear regression in this embodiment, well known to those skilled in the art. A best fit line to the data of curve 118 is shown in FIG. 10 as line 130. The slope m is indicative of the thermal response of the measurement system over time. While in this embodiment, the slope is determined using logarithms and time signals for the critical measurement interval where $t_1$ equals seven seconds and $t_2$ equals ten seconds, other values could be used for analysis.

The figure of merit computation indicates the quality of fit of the LogDiff data to the best fit straight line. A preferred method of assessing quality of fit is to compute the sum of squared differences of data from the calculated best fit line. This is performed at 132 for the LogDiff data included within the critical measurement interval and is represented by Equation 5 below:

$$FOM_1 = \sum_{n=f_s*t_1}^{n=f_s*t_2} \left[ m * \left( \frac{n}{f_s} \right) + b - \text{LogDiff}_n \right]^2 \quad \text{(Eq. 5)}$$

where index $n=f_s*t$ is equivalent to time t, and $\text{LogDiff}_n$ is computed as shown in equation 4.

For example, if all LogDiff data points fall on the same line, there would be no variations from the best fit line and the sum of the squares would therefore be zero. In a worse case, one or more data points may greatly vary causing the sum of the squares to fall outside of the predetermined acceptable range. If the sum of the squared differences does not exceed the FOM threshold 134 and the temperature rises monotonically during the critical measurement interval, the data is considered suitable for processing with the predictive algorithm. In the simple first-order case described by Equations 1, 2 and 3, the log of the time derivative of temperature is precisely a straight line and the temperature versus time curve is always monotonic. Thus, over the brief period of time covered by the critical measurement interval, we expect the LogDiff data to closely fit a straight line, and the quality of that fit is an indicator of the applicability of the data acquired during the critical measurement interval to predictive temperature determination.

If the data quality is found to be unacceptably low (in the second embodiment, this is indicated by the FOM being too high), or if the rise of temperature is not monotonic, we retry the prediction with a new critical measurement interval 126, provided that the maximum allowable number of retries has not been exceeded 124. The new critical measurement interval is preferably defined by resetting the delay from measurement start time $t_0$ to its beginning time $t_1$. In a preferred embodiment of the invention there are a limited number of possible critical measurement intervals, defined by their delays from $t_0$ to $t_1$ (delta__first, delta__second, etc.) and their widths (width__first, width__second, etc.). These critical measurement intervals may overlap; for example, the second interval may use some to the data points used in the first interval.

During initialization $t_1-t_0$ is set to delta__first and $t_2-t_1$ is set to width__first 64. Upon determination that the FOM exceeds the FOM threshold and whenever there is data in the critical measurement interval that does not rise monotonically, the critical measurement interval is reset 126. Should the FOM still exceed the FOM threshold, the critical measurement interval is reset again. Associated with each of the possible critical measurement intervals, there are empirically derived values for $\alpha$ and $\beta$ that are utilized in the subsequent computation of the predicted stabilization temperature. Should the predictive measurement time be exceeded due to excessive FOMs for all available critical measurement intervals 124, the instrument lapses into the monitor mode 74.

Although stated above in terms of FOM, the above procedure of resetting the delay from the start time to to a new critical period and resetting the measurement interval applies to the first embodiment of data quality determination as well. Additionally, a limited number of retries is available in this embodiment before the processor lapses into the monitor mode 74. In one embodiment, a second critical period is selected to occur three seconds after the first critical period. Thus, the $t_1$ for the second critical period would be 13 seconds after $t_0$. In this embodiment, the maximum number of retries, or critical periods, is limited to three before the system lapses into the monitor mode. In a second embodiment, subsequent critical periods may overlap the respective previous critical period up to but not including data having a zero or negative slope. In this embodiment, the limit on retries, or the number of critical periods allowed, may exceed three depending on the extent of overlap.

Figure 12:
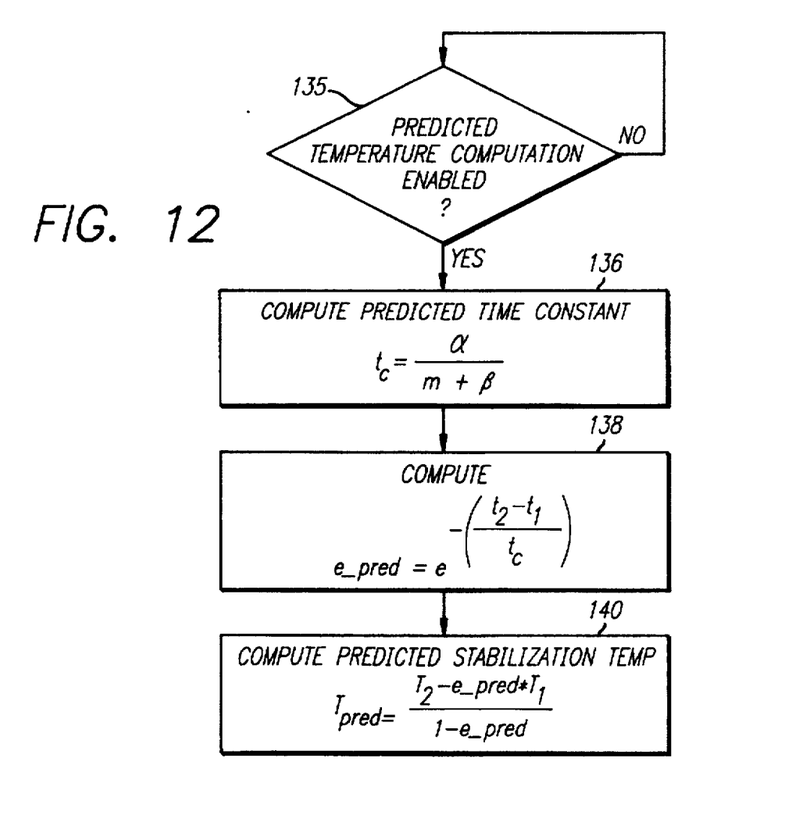
FIG. 12 is a flow diagram to Compute the Predicted Temperature.

FIG. 12 illustrates the logical flow of the Compute Predicted Temperature task. If the temperature signal is determined to be of sufficient quality 134 (FIG. 11), the processor 28 (FIG. 2) begins the prediction computation 127. The thermometer of the present invention uses the fact that, in a case such as the measurement of human temperature, certain predictable trends exist in the transient temperature behavior of the system after the probe is inserted into a human subject. Exploitation of those trends requires an accounting of time elapsed since insertion and an understanding, in part empirical, of the trends exhibited by the specific system at hand. The present invention uses the above-mentioned fact by making it possible to apply the simple first order predictive process to a situation where the dynamics would indicate a more complex, higher order solution. In its operation, the present invention uses empirical relationships established a priori.

As discussed above, the present invention in one aspect incorporates, through empirical relationship, trends in the response of probes inserted into human subjects. Therefore, the lag dynamics inherent in electronic thermometers of this type and in the surrounding skin and tissue are considered. It corrects for variations in the thermal response of the measurement components to improve the accuracy of predicting the final temperature in as short a time period as possible. The inventors have discovered that at a particular point in time following the start time of a measurement, the slope of a curve determined from the logarithm of the differential of the measured temperature signals is approximately inversely proportional to a time constant that would, given the instantaneous temperature versus time trend, yield the correct stabilization temperature prediction if a simple first order predictive equation such as equation 1 were used. The estimated time constant can therefore be determined and then substituted into a predictive equation, such as Equation 2, to predict the final temperature $T_F$.

The relationship between the time constant and die above-mentioned slope can be determined empirically by acquiring a set of data, then using the data acquired to relate the time constant, computed from observed temperature measurements and stabilization temperature, to the slope at some approximately constant time, as detailed in FIG. 13 (discussed below). For example, in a preferred embodiment 136 $t_c = \alpha/(m+\beta)$, where $t_c$ is the estimated time constant for a given interval on the curve, m is the slope of the line computed from the logarithms of the differences of the measured time signals 128, and $\alpha$ and $\beta$ are empirical constants derived from data analyzed a priori during a particular time interval, such as, for example, temperature signals received during the critical measurement interval between time references $t_1$ 110 and $t_2$ 112 (FIG. 10). If a different critical measurement interval is used for the predictive process, other values for constants $\alpha$ and $\beta$ would be required.

Provided that the predicted temperature computation task is enabled 135, the predicted time constant $t_c$ is computed 136. A value referred to as e_pred is then computed 138:

$$e_{pred} = e^{-\left(\frac{t_2-t_1}{t_c}\right)} \quad \text{(Eq. 6)}$$

Finally, $T_{pred}$ is computed 140:

$$T_{pred} = \frac{T_2 - T_1 * e_{pred}}{1 - e_{pred}} \quad \text{(Eq. 7)}$$

As discussed above, the empirically derived constants are determined a priori from a set of experiments where actual measured temperature signals are analyzed during a particular time interval, for example during the three seconds between $t_1$ and $t_2$ (FIG. 10). The dynamically determined time constant is applied to the predictive equation (Equation 2), to predict the final temperature, represented as the variable $T_{pred}$. The value of $T_{pred}$ may then be displayed 144 (FIG. 4). Thus, the predictive equation is adjusted by the dynamically determined time constant that is representative of the thermal response of the measurement system to account for variations in the measurement system. Hence the system corrects for variations in the response of the measurement components to yield predictions that are accurate for a large range of measurement conditions and subjects.

Figure 13:
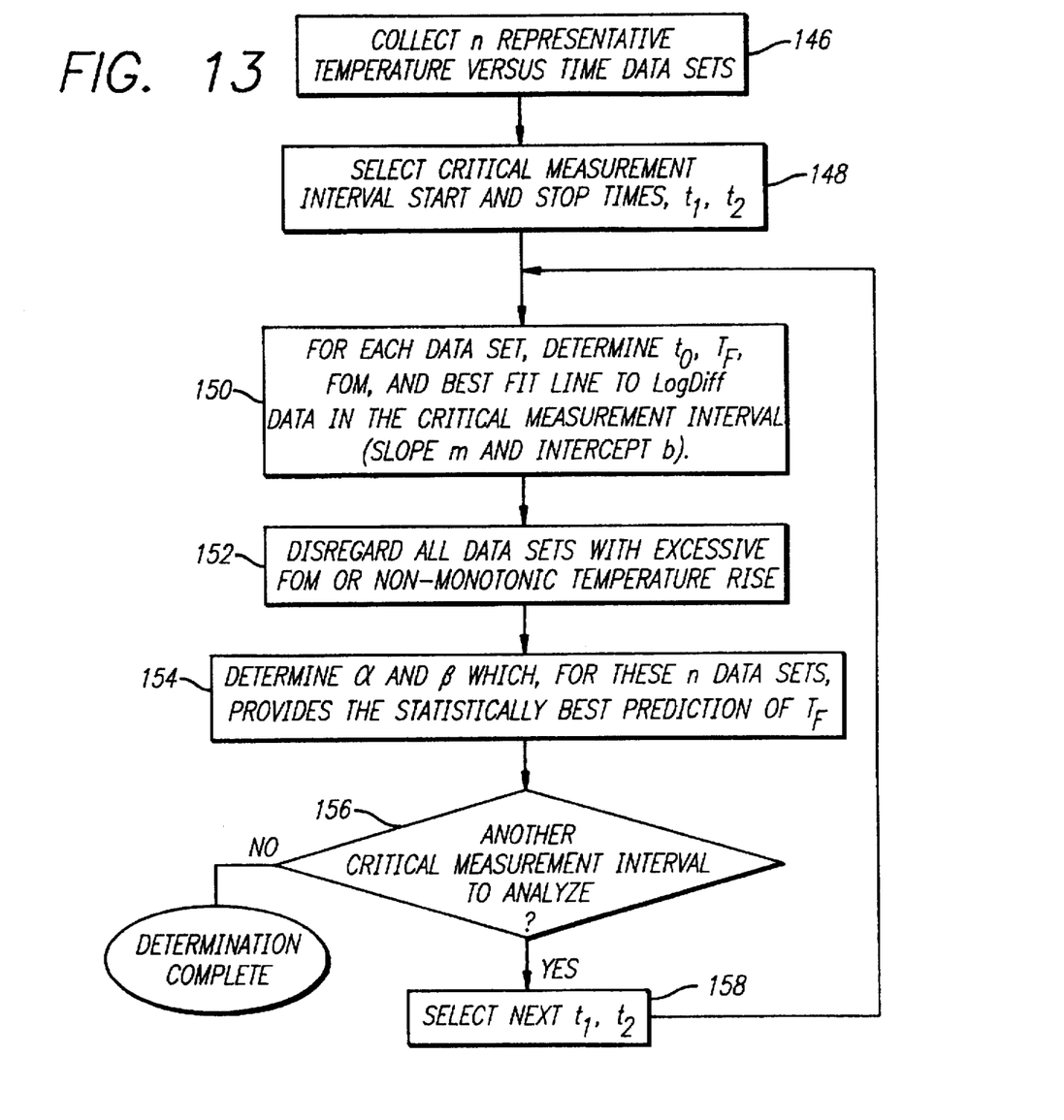
FIG. 13 is a flow diagram for the Determination of Critical Constants $\alpha$ and $\beta$.

Referring to FIG. 13, the steps involved in one embodiment with determining the empirical constants $\alpha$ and $\beta$ associated with each critical measurement interval are outlined. In one embodiment, there are several $\alpha, \beta$ value pairs, in order to enable the thermometer to adapt to uncertain data quality. Each pair will be used in sequence, until either an acceptable figure of merit is computed 134 or retries are exhausted 124.

The first step in determining these constants is to gather representative clinical temperature data 146. These data sets should have enough values to ensure that thermal equilibrium is reached in the system. A separate analysis of the data sets is performed for each critical measurement interval that might be utilized in the predictive thermometer of the invention. For each of these possible critical measurement intervals there is an associated $t_1$ and $t_2$ 148. The points between these two time values are used for the analysis for this particular $\alpha$ and $\beta$. For each data set, an analysis 150 is performed including steps that are similar to those performed in the actual predictive thermometer. These include determining $t_0$ and the FOM, and the best fit line to the LogDiff data in the critical measurement interval of interest. All data sets with excessive FOM or non-monotonic temperature rise in the critical measurement interval under consideration are disregarded 152. Then, a determination 154 is made of the $\alpha$ and $\beta$ that, for these data sets, provides the statistically best prediction of $T_F$ based upon the computation of predicted temperature shown in FIG. 12. The data sets are then re-evaluated for the next $\alpha$, $\beta$ pair, using new values for $t_1$ and $t_2$ 156, 158.

While several forms of the invention have been illustrated and described, it will also be apparent that various modifications can be made without departing from the spirit and scope of the invention. Accordingly, it is not intended that the invention be limited except by the appended claims.

What is claimed is:

1. A thermometer for determining the temperature of an object, comprising:

a sensor that provides temperature signals in response to sensing the temperature of the object, the temperature signals varying in time; and a processor that receives the temperature signals, selects a first time frame from a time period occurring before the sensor reaches the temperature of the object, monitors the temperature signals over the first selected time frame, determines a selected characteristic of the temperature signals of the first time frame, calculates the logarithm of the characteristic of the temperature signals and uses the logarithm to calculate a prediction of the temperature of the object prior to the sensor reaching the temperature of the object.

2. The thermometer of claim 1 wherein the characteristic of the temperature signals of the first time frame determined by the processor comprises the differences between the temperature signals of the first time frame.

3. The thermometer of claim 1 wherein the characteristic of the temperature signals of the first time frame determined by the processor comprises the derivative of the temperature signals.

4. The thermometer of claim 1 wherein the processor calculates the temperature of the object based on the logarithm along with predetermined empirical variables.

5. The thermometer of claim 1 wherein the processor compares the temperature signals received in the selected first time frame to a predetermined integrity criterion and if the temperature signals in the frame do not meet the integrity criterion, the processor excludes the first time frame from its calculation of the temperature of the object.

6. The thermometer of claim 5 wherein the processor determines the first time derivative of the temperature signals of the selected first time frame and excludes the frame of temperature signals from its calculation of the temperature of the object if the first time derivative is negative within the first time frame.

7. The thermometer of claim 5 wherein the processor monitors the temperature signals over a second selected time frame if the first selected time frame is excluded in determining the temperature of the object.

8. The thermometer of claim 7 wherein the processor selects the second time frame to occur after the first time frame.

9. The thermometer of claim 7 wherein the processor selects the second time frame to overlap the first time frame.

10. The thermometer of claim 5 wherein:

the processor monitors the temperature signals over a plurality of different selected time frames if the preceding time frame is excluded from the determination of the temperature of the object; and the processor limits the number of the plurality of time frames monitored to those occurring within a predetermined period before the sensor reaches the temperature of the object.

11. The thermometer of claim 1 wherein:

the processor determines a start time at which the sensor has begun sensing the temperature of the object; and the processor selects the first time frame to include temperature signals occurring after the start time.

12. The thermometer of claim 11 wherein:

the processor determines that the sensor is sensing the temperature of the object by calculating the second derivative of the temperature signals from the sensor and when the second derivative exceeds a threshold, setting the start time based on the calculation.

13. The thermometer of claim 12 wherein:

the processor sums the second derivatives of the temperature signals within a selected time frame, compares the sum of the second derivatives to a threshold value, and determines the start time when the sum exceeds the threshold.

14. The thermometer of claim 13 wherein the processor sets the start time to occur at the end of the time frame in which the sum of the second derivatives exceeded the threshold.

15. The thermometer of claim 11 wherein the processor calculates the first time derivative of the temperature signals, compares the first time derivative to a first derivative threshold, and selects the start time to begin at the temperature at which the first derivative exceeded the first derivative threshold.

16. The thermometer of claim 1 wherein the processor monitors the variation of the temperature signals from a reference point during the first selected time frame, compares the variation to a predetermined range, and provides a data quality signal representative of the comparison.

17. The thermometer of claim 16 wherein the variation of the temperature signals is determined as the sums of squares of the differences of the temperature signals from the reference point over the first time frame.

18. The thermometer of claim 16 wherein the processor provides a data quality alarm signal when the data quality signal is outside a quality range.

19. The thermometer of claim 18 wherein the processor selects a second time frame when the data quality alarm signal is provided.

20. A thermometer for determining the temperature of an object, comprising:

a sensor having a temperature different from the object and providing temperature signals in response to sensing the temperature of the object, the temperature signals varying in time; and a processor that receives the temperature signals, monitors the temperature signals over a first selected time frame, determines the first time derivative of the temperature signals of the first time frame, calculates the logarithm of the derivative of the temperature signals and based on the logarithm, calculates a prediction of the temperature of the object before the sensor reaches the temperature of the object.

21. The thermometer of claim 20 wherein the processor compares the temperature signals received in the selected first time frame to a predetermined integrity criterion and if the temperature signals in the frame do not meet the integrity criterion, the processor excludes the first time frame from its calculation of the predicted temperature of the object.

22. The thermometer of claim 21 wherein the processor excludes the frame of temperature signals from its calculation of the predicted temperature of the object if the first time derivative is negative within the first time frame.

23. The thermometer of claim 22 wherein the processor monitors the temperature signals over a second selected time frame if the first selected time frame is excluded in determining the temperature of the object.

24. The thermometer of claim 23 wherein the processor selects the second time frame to occur after the first time frame.

25. The thermometer of claim 23 wherein the processor selects the second time frame to overlap the first time frame.

26. The thermometer of claim 21 wherein:

the processor monitors the temperature signals over a plurality of different selected time frames if the preceding time frame is excluded from the determination of the temperature of the object; and the processor limits the number of the plurality of time frames monitored to those occurring within a predetermined period before the sensor reaches the temperature of the object.

27. The thermometer of claim 20 wherein:

the processor determines a start time at which the sensor has begun sensing the temperature of the object; and the processor selects the first time frame to include temperature signals occurring after the start time.

28. The thermometer of claim 27 wherein:

the processor determines that the sensor is sensing the temperature of the object by calculating the second derivative of the temperature signals from the sensor and when the second derivative exceeds a threshold, setting the start time based on the calculation.

29. The thermometer of claim 27 wherein:

the processor sums the second derivatives of the temperature signals within a selected time frame, compares the sum of the second derivatives to a threshold value, and determines the start time when the sum exceeds the threshold.

30. The thermometer of claim 29 wherein the processor sets the start time to occur at the end of the time frame in which the sum of the second derivatives exceeded the threshold.

31. A method for determining the temperature of an object, comprising the steps of:

sensing the temperature of the object and providing temperature signals representative of the sensed temperature of the object, the temperature signals varying in time;

selecting a first time frame from a time period occurring before the sensor reaches the temperature of the object;

monitoring the temperature signals over the first selected time frame;

determining a selected characteristic of the temperature signals of the first time frame;

calculating the logarithm of the characteristic of the temperature signals of the first time frame; and calculating a prediction of the temperature of the object based on the logarithm prior to the sensor reaching the temperature of the object.

32. The method of claim 31 wherein the step of determining a selected characteristic of the temperature signals of the first time frame comprises determining the derivative of the temperature signals.

33. The method of claim 31 comprising the further steps off comparing the temperature signals received in the selected first time frame to a predetermined integrity criterion; and if the temperature signals in the frame do not meet the integrity criterion, excluding the first time frame from the step of calculating the temperature of the object.

34. The method of claim 33 wherein the step of comparing comprises determining if the first time derivative of the temperature signals of the selected first time frame are negative and excluding the frame of temperature signals from the step of calculating the temperature of the object if the first time derivative is negative within the first time frame.

35. The method of claim 33 wherein the step of monitoring the temperature signals over a first selected time frame comprises monitoring the temperature signals over a second selected time frame if the first selected time frame is excluded in determining the temperature of the object.

36. The method of claim 35 comprising the step of selecting the second time frame from temperature signals occurring after the first time frame.

37. The method of claim 35 comprising the step of selecting the second time frame to overlap the first time frame.

38. The method of claim 35 wherein the step of monitoring the temperature signals over a first selected time frame comprises monitoring the temperature signals over a plurality of different selected time frames if the preceding time frame is excluded from the determination of the temperature of the object; and limiting the number of the plurality of time frames monitored to those occurring within a predetermined period before the sensor reaches the temperature of the object.

39. The method of claim 31 further comprising the steps of:

determining a start time at which the sensor has begun sensing the temperature of the object; and selecting the first time frame to include temperature signals occurring after the start time.

40. The method of claim 39 wherein the step of determining a start time comprises:

calculating the second derivative of the temperature signals from the sensor and when the second derivative exceeds a threshold, setting the start time based on the calculation.

41. The method of claim 39 further comprising the steps of:

summing the second derivatives of the temperature signals within a selected time frame;

comparing the sum of the second derivatives to a threshold value, and determining the start time when the sum exceed the threshold.

42. The method claim 41 wherein the step of determining the start time comprises setting the start time to occur at the end of the time frame in which the sum of the second derivatives exceeded the threshold.

* * * * *

UNITED STATES PATENT AND TRADEMARK OFFICE
CERTIFICATE OF CORRECTION

PATENT NO. : 5,738,441
DATED : Apr. 14, 1998
INVENTOR(S) : Vivien J. Cambridge, Thomas L. Koger, William L. Nall, Patrick Diaz It is certified that error appears in the above-identified patent and that said Letters Patent is hereby corrected as shown below:

Column 2, Lines 57 - 59, Change end of equation from; "$-e^{(t/\tau)}$", to read -- $-e^{-(t/\tau)}$ --.

Signed and Sealed this

Twenty-second Day of September, 1998

Attest:

BRUCE LEHMAN

Attesting Officer   Commissioner of Patents and Trademarks